Aug. 15, 1967     A. STRAZDINS ETAL     3,335,914

FOUNTAIN SYRINGE

Filed March 10, 1966

United States Patent Office 3,335,914
Patented Aug. 15, 1967

3,335,914
FOUNTAIN SYRINGE
Atis Strazdins, 128 Lakeview Parade, Primbee via Port Kembla, New South Wales, Australia, and Stanley Chris Stylis, 2 Cedar Ave., Windang, New South Wales, Australia
Filed Mar. 10, 1966, Ser. No. 533,166
Claims priority, application Australia, Mar. 10, 1965, 56,164/65
3 Claims. (Cl. 222—107)

This invention has been devised to provide a fountain syringe which will hold a determined quantity of liquid or semi-liquid such as a medicament ready for use for human beings, animals and birds.

The object of the invention is to provide a construction of fountain syringe which is an improvement over the fountain syringe of U.S. Patent No. 3,101,712. In this known arrangement the two half shells of the syringe are fused together and then filled through the tubular member so as to exclude all air. This is a slow and consequently costly operation as the tubular member necessarily has a very small bore. The instant syringe provides the advantage over the said prior syringe that it can be more easily filled and assembled as a sealed container after filling.

Broadly the present invention is a fountain syringe comprising first and second half shells of elastoplastic material adapted to be locked together in sealing relationship to provide a vessel of spheroidal shape; a tubular member projecting from the second half shell at a point of even distance from its periphery and having a central bore in communication with said vessel; means to close the outlet from the bore; the first half shell having a V-shaped groove adjacent its periphery, said groove permitting the first half shell to be deformed by the application of pressure thereon into the second half shell, when the shells are locked together, and into close contact with the inner surface of the second half shell in the deformed position; the outer wall of the said groove being extended to form a cylindrical flange of such a height that it forms with the first half shell a vessel of sufficient capacity to accommodate the quantity of medicament required to completely fill the syringe excluding any air therefrom, said flange having on its inner surface an inwardly projecting shoulder with a lead-in ramp thereon, the second half shell having a further cylindrical flange extending from its periphery in the direction of the tubular member and co-axial therewith, said further flange having on the outer surface an outwardly projecting step adapted to engage said inwardly projecting shoulder of said first mentioned flange to lock the two half shells together.

The invention is described in greater detail with reference to the annexed drawings wherein.

Figure 1:
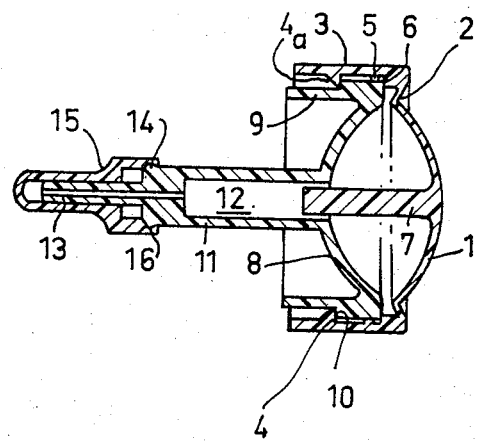
FIGURE 1 is a longitudinal central sectional view of the fountain syringe incorporating a nozzle and sealing cap, and showing the first half shell in undeformed position.
Figure 2:
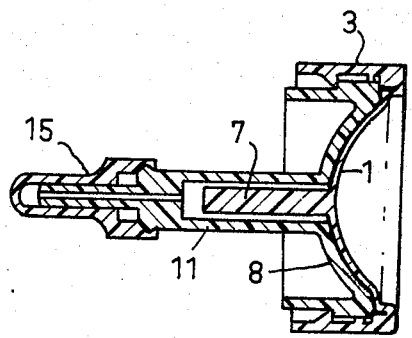
FIGURE 2 is a view similar to FIGURE 1 but showing the first half shell deformed into the second half shell.
Figure 3:
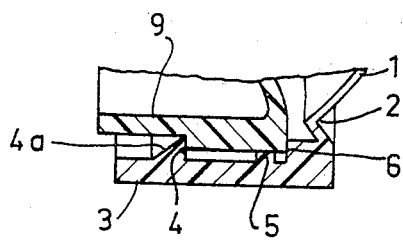
FIGURE 3 is an enlarged fragmentary detail of the syringe showing the manner in which the flanges of the half shells co-operate to lock the half shells together.

The spheroidal shaped vessel is made of elastoplastic material and is constituted by two half shells. The first half shell consists of a half spheroidal body 1 having a V-shaped groove 2 adjacent its periphery and opening inwardly in the direction of the second half shell. The outer wall of the groove is extended towards the second half shell to form a cylindrical flange 3 which forms with the first half shell a vessel of sufficient capacity to accommodate the quantity of medicament required to completely fill the syringe excluding any air therefrom. This flange is provided on its inner surface adjacent its free end with an inwardly projecting shoulder 4 having a lead-in ramp 4a; it is also provided on the same surface with a sealing ridge 5 and an abutment stop 6. A plunger 7 is fixed to the inner face of the body 1 at the center thereof and it projects axially therefrom.

The second half shell consists of a half spheroidal body 8 having a tubular member 11 with a central bore 12 and being fixed to the outer face of the body 8 at a point of even distance from its periphery, and projecting axially therefrom in alingment with the plunger 7. A cylindrical flange 9 extends from the periphery of the body 8 in the direction of the tubular member 11 and co-axial therewith so as to form an acute angle with the body 8. This flange 9 has a step 10 on the outer surface thereof at a location spaced from the junction of body 8 and flange 9.

For one form of use the tubular member 11 has a nozzle 13 projecting from the end thereof and for another form of use it has conventional means for attaching a hypodermic needle thereto. The needle may be connected to the nozzle 13 or the nozzle may be omitted. In either form means are incorporated to seal the outlet of the tubular member until it is to be used. As illustrated in FIGURE 1 by way of example the tubular member has a flange-like bead 14 projecting from the end and a cap 15 is provided with a complementary groove 16. The cap is held in sealing position by the bead 14 engaging the groove 16. It is to be understood that the invention is not limited to any particular form of such cap. It may be sealed by a membrane capable of being fractured or pierced.

The base of the cylindrical flange 9 is a press fit in the sealing ridge 5 of the cylindrical flange 3 so that when pressed into position therein, the step 10 is engaged by the shoulder 4 thus locking the two half shells together. The advantages of this arrangement in promoting ease of filling and assembly will be obvious. The body 1 with flange 3 constitutes a receptacle or vessel into which the medicament can be filled with little possibility of spillage. The ramp 4a provides a gradual "lead in" facilitating the introduction of flange 9 within flange 3. Once in position, the co-operative relationship of step 10 and shoulder 4 prevents withdrawal of the second half shell. Finally sealing is augmented by co-operation of the flange 9 with sealing ridge 5 and abutment stop 6.

The tubular member 11 is of such length and is made sufficiently flexible that when fitted with a needle for a hypodermic injection it can be first used as an aspirator by simply squeezing the tube, and then releasing the squeezing pressure, whereup the tubular member resumes its original shape and a partial vacuum is created therein whereby aspirating action is created. The medicament is displaced by applying such pressure to the first half shell that it deforms into the second half shell. The groove 2 permits and facilitates complete inversion of the first half shell commencing from the outer perimeter of the body and when deformation is complete the inner face of the body 1 is in close contact with the inner face of the body 8. The medicament is thus discharged from the vessel and as the first half shell remains in the deformed position there is no tendency to draw back the discharged medicament.

The plunger 7 is only required to displace medicament in the tubular member 11 in an ejecting operation.

For most purposes the nozzle 13 is made integral with the tubular member 11 and, in this event, is made of an elastoplastic material which is so pliable that it can be inserted into a small open passage in a patient without injuring the wall of the passage.

Figure 4:
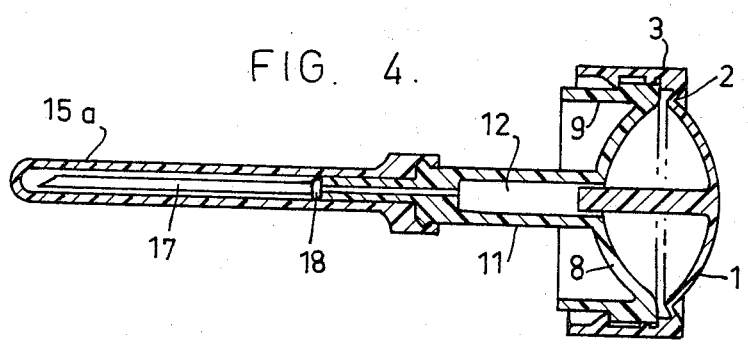
FIGURE 4 is a longitudinal central sectional view of the fountain syringe showing one manner of fitting a hypodermic needle thereto, and a sealing cap.

As shown in FIGURE 4 the hypodermic needle 17 is mounted in the nozzle 13. It has a ring or flange on the inner end which abuts the shoulder 18 formed by the base of the nozzle 13 in the tubular member 11. The cap 15a can be secured in the same manner as the cap 15. Alternatively the needle can be secured in the nozzle 13 in a moulding or fitting operation.

We claim:

1. A fountain syringe comprising first and second half shells of elastoplastic material adapted to be locked together in sealing relationship to provide a vessel of spheroidal shape; a tubular member projecting from the second half shell at a point of even distance from its periphery and having a central bore in communication with said vessel; means to close the outlet from the bore; the first half shell having a V-shaped groove adjacent its periphery, said groove permitting the first half shell to be deformed by the application of pressure thereon into the second half shell, when the shells are locked together, and into close contact with the inner surface of the second half shell in the deformed position; the outer wall of the said groove being extended to form a cylindrical flange of such a height that it forms with the first half shell a vessel of sufficient capacity to accommodate the quantity of medicament required to completely fill the syringe excluding any air therefrom, said flange having on its inner surface an inwardly projecting shoulder with a lead-in ramp thereon, the second half shell having a further cylindrical flange extending from its periphery in the direction of the tubular member and co-axial therewith, said further flange having on the outer surface an outwardly projecting step adapted to engage said inwardly projecting shoulder of said first mentioned flange to lock the two half shells together.

2. A fountain syringe as claimed in claim 1 wherein the first-mentioned cylindrical flange is additionally provided on its inner surface inwardly of the shoulder with a sealing ridge and an abutment stop.

3. A fountain syringe according to claim 1 in which the first half shell has a plunger fixed thereto in axial alignment with the bore of said tubular member, said plunger being adapted to enter said bore when said half shells are locked together and said first half shell is deformed.

References Cited

UNITED STATES PATENTS

| | | | |
|---|---|---|---|
| 2,687,831 | 8/1954 | Miller | 222—569 |
| 2,732,978 | 1/1956 | Oakland | 222—567 X |
| 2,839,228 | 6/1958 | Levine | 222—567 X |
| 3,101,712 | 8/1963 | Strazdins et al. | |

ROBERT B. REEVES, *Primary Examiner.*

N. L. STACK, *Assistant Examiner.*